Feb. 8, 1966 R. N. LEVAKE 3,233,315
PIPE ALIGNING AND JOINING APPARATUS
Filed Dec. 4, 1962
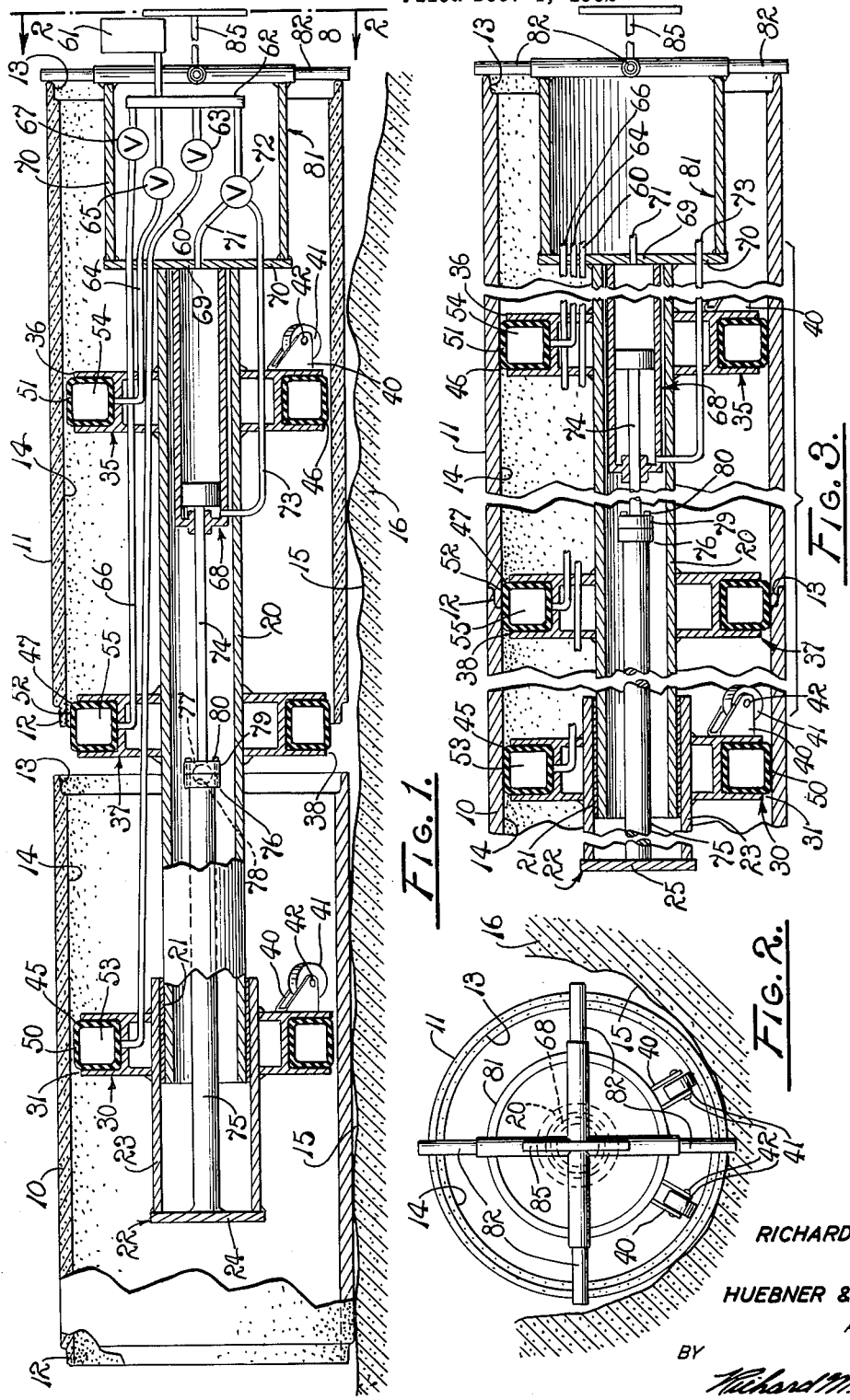
RICHARD N. LEVAKE
INVENTOR
HUEBNER & WORREL
ATTORNEYS
BY United States Patent Office 3,233,315
Patented Feb. 8, 1966

3,233,315
PIPE ALIGNING AND JOINING APPARATUS
Richard N. Levake, Phoenix, Ariz., assignor to Plastic Materials, Inc., a corporation of California
Filed Dec. 4, 1962, Ser. No. 242,303
5 Claims. (Cl. 29—237)

This invention relates to a pipe aligning and joining apparatus adapted to join separate sections of pipe in making up a pipe string. It more particularly relates to apparatus adapted to be inserted within tubular pipe sections for longitudinally aligning the same and joining a pair of such pipe sections in endwise abutment.

During the fabrication of underground conduits constructed from a plurality of individual pipe sections of uniform diameter and length, the problem of accurately and speedily aligning each successively laid pipe section with the preceding pipe sections is continually present. In constructing such conduits, it is a common practice to excavate a trench slightly wider than the diameter of the pipe sections and to form the trench with a bottom of loose earth at a gradient approximately conforming to the desired slope of the finished conduit. The conduit is then assembled by successively positioning individual sections of pipe in the trench, aligning each section with an immediately preceding section and joining the sections in endwise abutment. During such aligning and joining, it sometimes is necessary to add back-fill material, such as loose soil, sand or gravel, to effect longitudinal alignment of the successive pipe section with the one immediately preceding. Such alignment normally is performed manually in laying pipe sections of a size permitting such manual movement. Obviously, manual setting is not entirely accurate, is quite tedious and sometimes dangerous, and is impossible to perform by a single workman in laying large diameter pipes having wall sections of such a thickness to result in gross weights greater than that capable of being lifted by the workman.

In one aspect the invention comprises apparatus for joining lengths of pipe in end-to-end assembly, the apparatus including a longiutdinal frame, first, second and third circular elements each having a smaller diameter than the internal diameter of the pipes, a bearing encircling the frame, and end cap mounted on the bearing for both rotation and longitudinal movement thereon, a stop carried on the end cap and engageable with the frame to limit longitudinal movement of the end cap in one direction, means rigidly securing the first element to the end cap, means mounting the second element on the frame at a fixed position longitudinally spaced from the first element, means mounting the third element on the frame at a fixed position intermediate the first and second elements, means carried by the frame and adapted to engage the inner peripheral surface of the pipes when the frame is moved axially within the pipes to support said elements concentrically therein, thereby defining respective annular intervals of spacing between said elements and the inner surface of the pipes, each of the elements being encircled by a normally deflated annulus of elastomeric material, each of the annuli when in normally deflated and contracted condition having a radial dimension less than said interval and being capable of inflation by pressure fluid to an expanded condition wherein the annuli bridge their respective intervals of spacing and frictionally engage the inner peripheral surface of the pipes, a pressure fluid actuated ram mounted within the frame, a two-section rod including a swivel coupling interconnecting the ram and the first element and capable of transmitting both tension and compression forces therebetween while permitting relative rotation, a source of pressure fluid, separate conduit means respectively connecting with said source, the annuli of said first, second and third elements and said ram, valve means interposed in said conduit selectviely to control inflation and deflation of said annuli and reciprocation of said ram, an indexing means carried by the frame and engageable with one end of the pipe to limit the axial insertion of the frame therein, thereby to position the third element at a predetermined axial position.

Accordingly, it is an object of the present invention to provide apparatus capable of efficiently effecting longitudinal alignment of a plurality of successive pipe sections.

Another object is to provide apparatus adapted frictionally to engage a pair of adjacent tubular pipe sections and to urge them into endwise abutment.

Another object is to provide apparatus capable of engaging adjacent tubular pipe sections and of rotating one section relative to the other while joining them in endwise abutment.

Another object is to provide a lightweight, easily manipulated, power actuated apparatus for efficiently joining a pair of pipe sections and effecting a seal therebetween.

A further object is to provide a pipe aligning and joining mechanism which includes apparatus for indexing the mechanism in a predetermined position relative to a pair of adjacent pipe sections and sequentially performing the steps of gripping the adjacent pipe, aligning the sections longitudinally, urging them into endwise abutment, rotating one relative to the other, and releasing the mechanism from the pipe sections to permit withdrawal therefrom.

These, together with other objects, will become more fully apparent upon reference to the following description and accompanying drawing.

In the drawing:

FIG. 1 is a longiutdinal, vertical section showing pipe aligning and joining apparatus incorporating the principles of the present invention received within two adjoining tubular pipe sections, portions being shown fragmentarily in elevation.

FIG. 2 is a view in end elevation taken from a position indicated by the line 2—2 of FIG. 1.

FIG. 3 is a foreshortened fragmentary view similar to FIG. 1 but showing the apparatus and the pipe sections in a position to effect longitudinal alignment and endwise abutment of the sections.

Referring more specifically to the drawing, a pair of tubular pipe sections are indicated at 10 and 11. Both pipe sections are normally of uniform predetermined diameter and length and are each provided with a tapered male end 12 and a complementary female end 13. In the construction of underground conduits employed to convey water and other liquids, the pipe sections are frequently formed of concrete thereby providing an inner peripheral surface 14 which is relatively smoother yet has a relatively high coefficient of friction comparable to that of cast iron pipe.

A trench is schematically illustrated at 15 which has been preformed in the earth and is of sufficient width to accommodate the outside diameter of the pipe sections. The bottom of the trench is usually covered with loose earth or soil 16, generally conforming to the grade line to be maintained in constructing the conduit.

The apparatus of the present invention includes a longitudinally extended tubular frame 20 having a sleeve bearing 21 press-fitted on one end thereof. An end cap 22 is provided with an annular wall 23 in circumscribing relationship to the bearing 21, thereby adapting the frame for rotation relative to the end cap as well as for longitudinal sliding movement with respect thereto. The distal end of the cap 22 is closed by an end wall 24.

A first support element 30 is fixed to the annular wall 23 of the end cap 22 as by welding, and is provided with a circular periphery 31 of a diameter less than the internal diameter of the pipe sections 10 and 11. The first support element 30 is annular in form as is a second support element 35 rigidly secured to the tubular frame 20 at a location remote from the end cap 22. The second support elment is also provided with a circular periphery 36 of a diamter less than the internal diameter of the pipe sections. A third support element 37 is provided with a similar circular periphery 38 and is disposed intermediate the first and second elements. The third or intermediate element 37 is rigidly secured to the frame 20, as by welding, at a predetermined axial station of reference. The reason for such location will soon become apparent.

The first and second support elements 30 and 35 are each provided with respective circumferentially spaced brackets 40 on which are mounted wheels 41 adapted for rotation about respective axes 42. The axes of rotation are substantially normal to the longitudinal axis of the frame 20 to permit ease of longitudinal movement of the frame within the pipe sections. It is to be noted that the wheels 41 support the frame 20 in a position to provide radial clearance between the circular peripheries 31, 36 and 38 of the first, second and third support ends 30, 35 and 37. Accordingly, a predetermined interval of spacing is provided between the peripheries of the support elements and the inner peripheral surface 14 of the pipe sections.

Each of the support elements 30, 35 and 37 is provided with an annulus, indicated respectively at 45, 46 and 47. These annuli are respectively provided with peripherial surfaces 50, 51 and 52 and internal cavities 53, 54 and 55 adapted to receive a pressure fluid. The annuli are constructed of an elastomeric material, such as rubber, and are in a normally contracted or deflated condition, as shown in FIG. 1. In such a deflated condition, the effective radial thickness of the annuli measured between their respective peripheral surfaces 50, 51 and 52 and the circular peripheries 31, 36 and 38 of the support elements is less than the intervals of spacing provided between said circular peripheries and the inner surface 14 of the pipe sections.

The apparatus of the present invention includes a provision for selective inflation and deflation of the annuli respectively carried on the first, second and third support elements 30, 35 and 37. A flexible conduit 60 is connected to the annulus 45 and provides communication between the cavity 53 thereof and a source of fluid pressure schematically illustrated at 61. The course of communication includes a distributing manifold 62 and a pressure fluid control valve 63. In a commercial embodiment of the apparatus, the pressure fluid employed is air under sufficient compression to provide the energy necessary to inflate the annuli. A similar flexible conduit 64 and control valve 65 provide selective communication between the internal cavity 54 of annulus 46 and the source of fluid pressure 61. In like manner, a conduit 66 and control valve 67 provided therein enable selective communication between the internal cavity 55 of the intermediate annulus 47 and the source of fluid pressure 61.

A pressure fluid actuated ram 68 is received within the tubular frame 20 and rigidly joined thereto by an end plate 69. An annular extension 70 is joined to the end plate 69 and axially projects therefrom a predetermined distance to support an indexing device subsequently to be described. A pair of conduits 71 and 73 interconnect the ram 68 and the source of pressure fluid 61 and under the control of a valve 72 alternately serve as inlet and outlet conduits for the pressure fluid. The ram 68 is interconnected with the end cap 22 by means of an axially extended piston rod 74 joined to a rigid strut 75 integrally connected to the end plate 64, as by welding. A swivel coupling, indicated generally at 76, permits relative rotation between the piston rod 74 and the strut 75. The swivel coupling includes a ball stud 77 rigidly carried at the distal end of the piston rod 74 and received in a socket 78 provided in the adjacent end of the strut 75. The ball is retained in the socket by means of a cap 79 detachably secured to the strut 75 by means of cap screws 80.

An indexing stop 81 is rigidly secured to the annular frame extension 70 and includes a plurality of radially extensible individual arms 82 adapted, when extended as shown, to engage an end of a pipe section when the frame is inserted within such a section and moved a predetermined axial distance. When the end of the pipe section 11 is so engaged by the indexing stop 81, as shown in FIG. 1, the third or intermediate support element is disposed at a predetermined axial station of reference substantially radially aligned with the opposite end of the pipe section.

*Operation*

The operation of the described embodiment of the subject invention is believed to be readily apparent and is briefly summarized at this point. It is to be assumed that the first pipe section 10 has been placed at the bottom of a trench 15 and sufficient back-fill material, such as the loose earth 16 has been deposited beneath and around the pipe section to support it in a desired position corresponding with the grade or slope line to be followed by the completed conduit. In completing the conduit, a plurality of pipe sections, such as 11, are successively placed in endwise abutment with the pipe section 10 and supported in longitudinal alignment therewith while the trench is back-filled.

The next succeding pipe section, such as 11, is deposited at the bottom of the trench 16 and the pipe aligning apparatus of the present invention is inserted axially through the section 11 until the indexing stop 81 engages the end 13. In the alternative, the apparatus may be inserted into the pipe section 11 prior to said section being deposited at the bottom of the trench. If such an alternative method is followed, the pipe 11 must be supported either manually or by suitable hoisting equipment to facilitate insertion within the pipe section 10, the free end of the apparatus carrying the first support element 30. Another alternative is to retract the radial arms 82 to permit movement of the apparatus axially within pipe 10, deposit pipe 11 in the trench, and return the apparatus to the position shown in FIG. 1. This can be accomplished by an elongated control handle, fragmentarily shown at 85.

Following insertion of the present apparatus within the two adjoining pipe sections 10 and 11, the relative positions are as illustrated in FIG. 1. It is to be noted that the annulus 47 of the intermediate support element 37 is disposed at an axial station of reference substantially radially aligned with the end 12 of pipe section 11 thereby permitting the peripheral surface 52 of the annulus to serve as a retaining form if a plastic sealing compound is to be used in joining the pipe sections. If such a compound is to be used, it can readily be spread in a uniform manner about the outer periphery of the tapered end 12 by first inflating the annuli 45 and 46 by admission of pressure fluid through valves 63 and 65 and subsequent rotation of the pipe section 11 relative to the pipe section 10. It is also to be noted that upon inflation of the annuli 45 and 46, the peripheral surfaces of these annuli grip respectively the inner surface 14 of the pipe sections 10 and 11. Since the annuli 45 and 46 are radially expanded a substantially equal distance and are mounted coaxially of each other, the pipe sections 10 and 11 are longitudinally aligned as a consequence of such inflation.

Following the longitudinal alignment of the adjoining pipe sections, the retraction of the pressure fluid ram 68 by appropriate movement of the control valve 73 effects longitudinal movement of the pipe section 11 toward the previously deposited pipe 10. Further retraction of the ram 68 effects endwise abutment to join the pipes 10 and 11 as illustrated in FIG. 2. Subsequntly, the annulus 47 is expanded by appropriate movement of the control valve 67. The expansion of this annulus smooths any excess sealing compound which may have been extruded through the abutting edges of the adjoining pipe sections. Accordingly, an annular ridge on the inner surface 14 is avoided which would otherwise reduce the capacity of the pipe and act as a resistance to flow through the finished conduit. Upon longitudinal joining of the two pipes, the pipe section 11 is then preferably covered with back-fill material prior to the deflation of the annuli 45, 46, and 47 and subsequent withdrawal of the apparatus.

Accordingly, an apparatus has been provided which may be readily inserted within the adjacent pipe sections in making up a conduit, the apparatus permitting rapid and accurate longitudinal alignment of the pipe sections prior to joining them in endwise abutment. In addition to accurate positioning of the pipe sections, the apparatus also permits progressive back-filling of the trench in which the conduit is being formed as successive sections of pipe are added to the conduit. Consequently, an accuracy and efficiency in fabricating underground conduits is attained which has not been previously achieved.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. Apparatus for longitudinally aligning and joining in endwise abutment a pair of tubular pipe members the apparatus comprising a longitudinally extended frame; a pair of longitudinally spaced, radially expansible and contractible elements, each being adapted for frictional engagement with the inner peripheral surface of said pipe members; means mounting one of said expansible elements on the frame for axial reciprocal movement toward and away from the other element; means mounting the other of said elements on the frame at a fixed axial location and means for positioning said other element in radial alignment with that end of one of said pipe members which is adjacent the other pipe member; said mounting means providing for relative rotation between said elements; power means operably associated with said elements to effect selective radial expansion thereof and consequent frictional engagement with the inner peripheral surface of said pipe members; and power means carried by the frame to effect selective reciprocal movement of one element relative to the other whereby expansion of said elements and subsequent relative axial movement of one element toward the other effects longitudinal alignment and abutment of the pipe members.

2. Apparatus for longitudinally aligning and joining in endwise abutment a pair of tubular pipe members of uniform length the apparatus comprising a longitudinally extended frame; a pair of longitudinally spaced elements; means mounting one of said elements on the frame for axial reciprocal movement toward and away from the other element; an intermediate element disposed between the elements of said pair; means mounting said intermediate element and the other of said elements on the frame at respective axial locations fixed relative to the frame; each of said elements being radially expandable and contractable and being adapted for frictional engagement with the inner surface of said pipe members; power means operably connected with said elements to effect selective radial expansion thereof and consequent frictional engagement with the inner peripheral surface of said pipe members; power means carried by the frame to effect selective reciprocal movement of said one element whereby expansion of said pair of elements and subsequent axial movement of said one element toward the other effects longitudinal alignment and endwise abutment of the pipe members; and indexing means carried by the frame and engageable with an end of one of said pipe members when the frame is inserted therein to position said intermediate element in radial alignment with the other end of said one pipe member.

3. Apparatus for longitudinally aligning and joining in endwise abutment a pair of tubular pipe members of uniform length and diameter the apparatus comprising a longitudinally extended tubular frame; first, second and third elements each having a circular periphery of a diameter less than the internal diameter of the pipe members; means mounting the first element on the frame for limited sliding reciprocal movement and rotation relative thereto; means mounting the second element at a fixed axial station longitudinally spaced from the first element; means mounting the third element at a fixed axial station intermediate the first and second elements; means carried by the frame and adapted to engage the inner peripheral surface of the pipe members when the fram is moved axially within the pipe members to support said elements substantially concentrically therewith, thereby defining respective annular intervals of spacing between the external peripheries of said elements and the inner surface of the pipe members; a normally deflated annulus of elastomeric material peripherally mounted on each of said elements, each of said annuli when in a normally deflated and contracted condition having a radial dimension less than said interval and capable of being inflated by pressure fluid to an expanded condition wherein said annuli bridge their respective intervals of spacing and frictionaly engage said inner peripheral surface of the pipe members; a pressure fluid actuated ram mounted within said tubular frame; a two section rod, including a swivel coupling, interconnecting said ram and said first element capable of transmitting both tension and compression forces therebetween while permitting relative rotation; a source of pressure fluid; separate conduit means respectively connecting with said source, the annuli of said first and second elements and said ram; and valve means interposed in said conduits selectively to permit inflation and deflation of said annuli and reciprocation of said ram.

4. Apparatus for longitudinally aligning and joining in endwise abutment a pair of tubular pipe members of uniform length and diameter the apparatus comprising a longitudinally extended tubular frame; first, second and third elements each having a circular periphery of a diameter less than the internal diameter of the pipe members; an annular bearing circumscribing the tubular frame; a tubular end cap mounted on the bearing for both rotation and longitudinal slidable reciprocation thereon; a stop carried on the end cap and engageable with the frame to limit reciprocal movement of the end cap in one direction; means rigidly securing the first element to the end cap; means mounting the second element on the frame at a fixed axial station longitudinally spaced from the first element; means mounting the third element on the frame at a fixed axial station intermediate the first and second elements; means carried by the frame and adapted to engage the inner peripheral surface of the pipe members when the frame is moved axially within the pipe members to support said elements substantially concentrically therewith, thereby defining respective annular intervals of spacing between the external peripheries of said elements and the inner surface of the pipe members; a normally deflated annulus of elastomeric material peripherally mounted on each of said elements, each of said annlui when in a normally deflated and contracted condition having a radial dimension less than said interval and capable of being inflated by pressure fluid to an expanded condition wherein said annuli bridge their respective intervals of spacing and frictionally engage said inner peripheral surface of the pipe members; a pressure fluid actuated ram mounted within said tubular frame; a two section rod, including a swivel coupling, interconnecting said ram and said first element; and capable of transmitting both tension and compression forces therebetween while permitting relative rotation; a source of pressure fluid; separate conduit means respectively connecting with said source, the annuli of said first, second and third elements and said ram; and valve means interposed in said conduits selectively to control inflation and deflation of said annuli and reciprocation of said ram.

5. Apparatus for longitudinally aligning and joining in endwise abutment a pair of tubular pipe members of uniform length and diameter the apparatus comprising a longitudinally extended tubular frame; first, second and third elements each having a circular periphery of a diameter less than the internal diameter of the pipe members; an annular bearing circumscribing the tubular frame; a tubular end cap mounted on the bearing for both rotation and longitudinal slidable reciprocation thereon; a stop carried on the end cap and engageable with the frame to limit reciprocal movement of the end cap in one direction; means rigidly securing the first element to the end cap; means mounting the second element on the frame at a fixed axial station longitudinally spaced from the first element; means mounting the third element on the frame at a fixed axial station intermediate the first and second elements; means carried by the frame and adapted to engage the inner peripheral surface of the pipe members when the frame is moved axially within the pipe members to support said elements substantially concentric therewith, thereby defining respective annular intervals of spacing between the external peripheries of said elements and the inner surface of the pipe members; a normally deflated annulus of elastomeric material peripherally mounted on each of said elements, each of said annuli when in a normally deflated and contracted condition having a radial dimension less than said interval and being capable of inflation by pressure fluid to an expanded condition wherein said annuli bridge their respective intervals of spacing and frictionally eengage said inner peripheral surface of the pipe members; a pressure fluid actuated ram mounted within said tubular frame; a two section rod, including a swivel coupling, interconnecting said ram and said first element; and capable of transmitting both tension and compression forces therebetween while permitting relative rotation; a source of pressure fluid; separate conduit means respectively connecting with said source, the annuli of said first, second and third elements and said ram; valve means interposed in said conduits selectively to control inflation and deflation of said annuli and reciprocation of said ram; and indexing means carried by the frame and engageable with one end of a pipe member to limit the axial insertion of the frame therein, thereby to position said third element at a predetermined axial station of reference.

References Cited by the Examiner

UNITED STATES PATENTS

| | | | |
|---|---|---|---|
| 2,621,867 | 12/1952 | Grettve | 29—252 X |
| 2,752,191 | 6/1956 | Pierce | 294—93 |
| 2,954,603 | 10/1960 | Moberly et al. | 254—29 X |
| 3,052,494 | 9/1962 | Williamson | 294—93 |
| 3,061,916 | 11/1962 | Kretz | 29—238 |

WILLIAM FELDMAN, *Primary Examiner.*